United States Patent [19]  [11] 3,907,929
Durst  [45] Sept. 23, 1975

[54] COMPATIBLE THREE-COMPONENT POLYMER ALLOYS

[75] Inventor: Richard R. Durst, Stow, Ohio

[73] Assignee: The General Tire & Rubber Company, Akron, Ohio

[22] Filed: Apr. 29, 1974

[21] Appl. No.: 464,901

Related U.S. Application Data

[63] Continuation-in-part of Ser. No. 215,682, Jan. 5, 1972, abandoned, which is a continuation-in-part of Ser. No. 101,176, Dec. 23, 1970, abandoned.

[52] U.S. Cl. ......... 260/876 B; 260/879; 260/880 B; 260/892; 260/894; 260/DIG. 32
[51] Int. Cl.$^2$ ................. C08L 53/02; C08L 25/06; C08L 25/10
[58] Field of Search ................ 260/876 B, 876 R

[56] References Cited
UNITED STATES PATENTS
3,476,829  11/1969  Gruver et al. ............... 260/876 B
3,781,383  12/1973  Finestone .................. 260/876 R FOREIGN PATENTS OR APPLICATIONS
1,145,923  3/1969  United Kingdom ............ 260/876 B Primary Examiner—Wilbert J. Briggs, Sr.

[57] ABSTRACT

This invention comprises blends of otherwise relatively incompatible polymers, particularly polystyrene and polybutadiene in weight ratios of at least about 4:1, by the incorporation of graded styrene-butadiene AB block copolymers in which the weight ratio of total styrene to total butadiene in the A and B segments ranges from about 60:40 to about 35:65, preferably about 55:45 to about 35:65, the total styrene content in the blend, both as homopolymer and copolymer, being about 75 to 90 weight percent of the blend. In the blends of this invention the discontinuous phase, made up of the polybutadiene-type polymers and the graded block copolymers, is present in the form of particles of which at least 70 percent by weight, preferably 85 percent by weight or more, have particle diameters in the range of 0.2 to 5 microns as measured by the "Zeiss Particle Size Analyzer."

16 Claims, No Drawings

COMPATIBLE THREE-COMPONENT POLYMER ALLOYS

CROSS-REFERENCE TO RELATED APPLICATION

This application is a continuation-in-part of U.S. patent application Ser. No. 215,682, now abandoned, filed Jan. 5, 1972 as a continuation-in-part of U.S. patent application Ser. No. 101,176 filed Dec. 23, 1970, and now abandoned.

BACKGROUND OF THE INVENTION

Previous efforts to develop a specific group of physical properties in a particular type of polymeric product have shown that the best single properties appear to be promoted in homopolymers and that any attempt to generate a combination of optimum physical properties by the preparation of copolymers from monomers whose homopolymers have a certain desired physical property tend to result in copolymers having a compromise in physical properties. This has been found even with the preparation of block copolymers. Efforts to combine the best features of two or more polymers in blends have usually resulted in products exhibiting discontinuities in properties with changes in proportions of the polymer ingredients, and in many cases the desirable properties of all of the polymer ingredients were lost, especially in blends of homopolymers. While these failures were first attributed to inadequate mixing procedures for dispersing one polymer in another, it now appears that such failures are due almost entirely to the inherent incompatibility of the polymers to be blended.

Incompatibility in polymer mixtures is sometimes necessary to develop desired physical properties in such mixtures. One of a number of instances of this phenomenon is the improvement of impact resistance of a composition based on a particular type of resinous homopolymer by adding a different incompatible polymer. Experimental research has shown that the two polymers must be incompatible in order to achieve the best result. In this case the term "incompatible" applies to materials a blend of which displays separately and distinctly the glass transition temperature (or second order transition temperature) characteristic of each of the incompatible materials in the blend.

Various combinations of resinous polymers and rubbery polymers have been tried in efforts to produce new materials having some combination of the desirable properties of the ingredients with a minimum of the undesirable properties of the ingredients. Among the combinations which have been tried have been combinations of styrene-type polymers and butadiene-type polymers, especially such combinations using high proportions of styrene polymers to produce tough polystyrene molding compositions.

Block copolymers of the types AB, ABA, $(AB)_n$ and $(AB)_nA$ have been prepared, and in specific systems certain defined block copolymers have been used in combination with polymerized conjugated dienes, polymerized styrene-type monomers and combinations of the two polymers, sometimes with additional ingredients. In the parent applications reference has been made to U.S. Pat. Nos. 2,727,878; 2,755,270; 3,445,543; 3,449,469 and 3,476,829 and United Kingdom Pat. Nos. 1,145,923 and 1,192,471. Other references which should be noted include U.S. Pat. Nos. 3,231,635; 3,251,905; 3,322,856; 3,377,404; 3,429,951; 3,441,530 and 3,464,850; Japanese Pat. No. 27866-71; published Dutch Patent Application No. 03376-66; French Pat. No. 1,457,763; and United Kingdom Pat. Nos. 1,053,596 and 1,120,404.

The subject application is directed particularly to three-component blends in which one component is a polystyrene, one component is a polybutadiene and one component is a graded AB styrene-butadiene block copolymer. Of the references set forth above, the most pertinent to the subject matter of this application is U.S. Pat. No. 3,476,829 which shows a combination of 40 to 95, preferably 60 to 90, weight percent of polystyrene, 4.5 to 39.5, preferably 9 to 30 weight percent of a rubbery conjugated diene polymer and 0.5 to 25, preferably 1 to 20, weight percent of a solution polymerized block copolymer of indeterminant structure but containing 50 to 98, preferably 70 to 90, weight percent of polymerized styrene, the combination containing 5 to 40, preferably 8 to 35, weight percent of rubber both as homopolymer and copolymer. This reference teaches the necessity of a peroxide cure to achieve the desired properties, but there is a simple disclosure of such a combination which was momentarily free of peroxide in the course of preparation of a combination within the invention of the reference. No properties or utility are taught for the peroxide-free combination. There is no concern for particle size of the discontinuous phase nor is there any criticality taught as to the structure of the block copolymer. The copolymers specifically disclosed appear to be graded AB styrene-butadiene copolymers having styrene-butadiene weight ratios of 50:50, 75:25, 88:12 and 90:10.

Another very pertinent reference is United Kingdom Pat. No. 1,145,923, which discloses a blend of 99 to 72.7 weight percent of polystyrene, 1 to 20 weight percent of polybutadiene and 0.5 to 9.1 weight percent of a graded AB styrene-butadiene block copolymer containing in combined form from 30 to 90 weight percent of styrene and from 70 to 10 weight percent of butadiene. There is no reference to the particle size of the discontinuous phase.

The principal object of this invention is to provide a novel blend of incompatible polymers, preferably homopolymers, using a particular type of block copolymer as an alloying agent or polymer-polymer surfactant to bind the incompatible polymers together while maintaining a high degree of phase separation but forming a link between the two phases. Another object is to provide novel polystyrene compositions having good impact strengths together with a good balance of properties from room temperature to −40°F. compared to presently available polystyrene compositions. Another object is to provide such compositions which can be prepared by melt mixing under shear as well as by solution blending techniques without a loss in desired properties. These objects as well as others which are apparent from this description are accomplished by this invention.

SUMMARY OF THE INVENTION

This invention comprises blends of otherwise incompatible polymers, particularly blends of homopolymers of butadiene dispersed in homopolymers of styrene. The discontinuous phase is rendered homogeneously dispersed in the matrix by the use of graded block copolymers of the general configuration AB, wherein A and B represent essentially polymerized substituents compatible with the polymers to be blended. The block copolymers act as polymer-polymer surfactants in alloying otherwise highly incompatible polymers. For the styrene-butadiene type system the block copolymers AB are such that A represents essentially polymerized styrene, and B represents essentially polymerized butadiene. These blends can be prepared satisfactorily by solution blending, mill mixing, high shear blender mixing as in a Banbury blender or any continuous mixer with sufficient attention to thorough mixing of components.

The blends of this invention provide for improvement in some physical properties of the continuous polystyrene-type phase without a significant reduction in the other physical properties. However, this improvement in properties depends largely upon the particle size of the discontinuous phase made up of particles of graded AB block copolymers and diene-type polymers. The most effective particles must each have a particle diameter in the range of 0.2 to 5 microns although particles outside this range still have a detectable effect. Consequently, at least 70 weight percent, preferably 85 or more weight percent, of the discontinuous phase must be present as particles within the recited particle size range. The physical state of the diene-type polymers and the graded AB block copolymers prior to incorporation into the styrene-type polymer is only significant to the degree that it affects the particle size of the discontinuous phase in the finished blend, said size also being directly affected by the amount of shear on the system during blending.

The blends of this invention are particularly useful for high-impact polystyrene sheeting as used, for example, in refrigerator interiors and for injection molded parts, e.g., vacuum cleaners housings.

DESCRIPTION OF THE PREFERRED EMBODIMENTS

It has been found that high-impact polystyrene with an excellent balance of properties is produced by blending polystyrenes and polybutadienes with graded AB type block copolymers in which each A is essentially polymerized styrene, the remainder of said block being polymerized butadiene, and each B is essentially polymerized butadiene, the remainder of said block being polymerized styrene, and the weight ratio of styrene to butadiene in A and B ranges from 35:65 to 60:40.

Similar studies have been made on mixtures of polyNstyrene, polyisoprene and AB block copolymers of styrene and isoprene as reported in European Polymer Journal, 1968, Vol. 4, pp. 173–205, Pergamon Press (England). These studies indicated that the presence of the polyisoprene was not as significant as the presence of the block copolymer.

The styrene-type polymers (A) employed as matrices in the blends of this invention can be simple homopolymers of styrene or copolymers containing at least about 90 weight percent of total styrene and alpha methyl styrene, if any, including at least 35 weight percent copolymerized styrene. The styrene-type copolymers can also contain not over about 10 weight percent of other copolymerized ethylenically unsaturated compounds including mono-unsaturated compounds such as acrylic compounds such as acrylic and methacrylic acid; esters, amides and nitriles on the order of methyl methacrylate, ethyl acrylate, methacrylamide, fumaronitrile and acrylonitrile; cyclic unsaturated compounds such as the nuclear chlorostyrenes, vinyl naphthalene, vinyl carbazole and acenaphthylene; and conjugated unsaturates such as butadiene, isoprene, chloroprene, 2,3-dichlorobutadiene, piperylene and the like. In bulk polymerization these resins are commonly prepared by heating the styrene and any comonomer at temperatures in the range of 100°C. to 200°C., with application of pressure if necessary to confine the monomers. The polymerization can also be carried out at lower temperatures by the addition of free-radical generating peroxidic catalysts such as benzoyl peroxide, acetyl peroxide, di-t-butyl peroxide and the like. The polymerization can also be carried out in a suspension to yield a dry powder or in emulsion, usually resulting in a latex of polystyrene which can be either coagulated to yield the solid powdery polystyrene or used as such for blending with one or both of other constituents in the form of latices. The polymerization can also be carried out in solution with precipitation of the product, if desired, by standard techniques such as steam-stripping.

The most important variable in the polystyrene constituent is its molecular weight. The vinyl aromatic polymer should have a number average molecular weight between about 50,000 to 500,000, preferably in the range of 100,000 to 300,000.

The diene-type polymers (B) employed in the discontinuous phases in the blends of this invention are non-crosslinked homopolymers of 1,3-butadiene, or non-crosslinked random copolymers containing at least 60 weight percent 1,3-butadiene, preferably at least 90 weight percent total conjugated dienes, 0 to 40 weight percent styrene or alphamethylstyrenes and not more than 10 weight percent of other ethylenically unsaturated compounds copolymerizable therewith. It will be understood that the above percentages are on the basis of the weight of the copolymers. Suitable monomers for copolymerization with butadiene include, for instance, vinyl aromatics such as the various mono- and polynuclear chlorinated styrenes, vinyl napthalene, vinyl carbazole and the like; vinyl ethers such as methyl vinyl ether, ethyl vinyl ether, isopropyl vinyl ether and the like; methyl isopropenyl ketone, isopropenyl acetate and the like; alpha, beta unsaturated acyl compounds such as acrylic acid, methacrylic acid, methyl acrylate, methyl methacrylate, ethyl acrylate, diethyl maleate, maleic anhydride and the like; and conjugated unsaturated compounds such as isoprene, 2,3-dimethyl-1,3-butadiene and the like.

The diene-type polymers employed in the blends of this invention can be prepared by any of the well-known polymerization systems such as bulk or solution polymerization systems.

The conjugated diene or rubber polymer should have a number average molecular weight between 100,000 and several million, preferably in the range of 250,000 to 500,000. It is also important that the conjugated diene or rubber polymer must be sufficiently incompatible with the matrix in which it is to be dispersed that a blend without the block copolymer would distinctly show the glass or second order transition temperature of the rubber polymer.

While it was originally thought that the principal benefit was derived in the systems of this invention using graded block copolymers in which the weight ratio of styrene to butadiene in total A and B ranged from 40:60 to 65:35, it now appears that the desired weight ratio range is from 35:65 to 60:40. Outside this relatively narrow range the desired balance of properties is not achieved.

The graded AB block copolymers (C) employed in the blends of this invention are such that each graded A segment is essentially polymerized styrene and each graded B segment is essentially polymerized butadiene.

Graded AB block copolymers differ from pure AB block copolymers of the same molecular weight in that some of the A monomer, generally about 20 weight percent of the total A monomer, is included in the B block while some of the B monomer appears in the A block. On the other hand, in the pure AB block copolymers the A block is all A monomer while the B block is all B monomer. One manifestation of this fact is the difference in glass transition temperatures between pure block copolymers and graded block copolymers of essentially the same molecular weight. For styrene-butadiene block copolymers the pure block copolymers generally show a glass transition temperature of about −105°C. for the polybutadiene block B and a glass transition temperature of about 105°C. for the polystyrene block A whereas the corresponding graded block copolymers of this invention show a glass transition temperature of about −90°C. ±5°C. for the graded polybutadiene block. By thermal analysis the glass transition temperature of the styrene block in the graded block copolymer of this invention usually cannot be seen, but it is not essential.

In pure block copolymers, the principal or major A block should have a number average molecular weight between 25 and 50 percent of the calculated number average molecular weight of the continuous polystyrene phase. However, in graded block copolymers because of the styrene monomer which is combined in the principally polybutadiene block the calculated polystyrene number average molecular weight of the polystyrene block in the graded block copolymer is closer to between 30 to 70 percent of the calculated number average molecular weight of the continuous polystyrene phase. Thus, with a continuous polystyrene phase having a number average molecular weight of 120,000 each graded A block in the block copolymer should have a calculated number average molecular weight of from 36,000 to 84,000 and will show principal blocks having actual number average molecular weights in the range of about 30,000 to 60,000. For graded block copolymers having A:B ratios between 35:65 and 60:40 the total calculated number average molecular weights can range from about 100,000 to 400,000. However, it has been found that the graded block copolymer should have a number average molecular weight in the range of 150,000 to 500,000, preferably about 200,000 to 300,000, in the composition of this invention.

The initial particle sizes of the graded AB block copolymers and the polybutadiene polymers are not particularly critical in themselves. Of primary concern is the particle size of the discontinuous phase in the final blend. In order to get the optimum balance of properties in the finished blends of this invention with special emphasis on impact resistance, it is necessary that at least 70 percent, preferably 85 percent or more, by weight of the defined and claimed particles in the finished blends of this invention each have a particle diameter in the range of 0.2 to 5 microns. A minor amount, i.e. no more than 30 weight percent, of the particles in any finished blend can be outside the defined range, but the particles having sizes below the defined range do not improve significantly physical properties of the blend as compared to the polystyrene alone, and the particles having sizes above the defined range tend to have an adverse effect on surface texture of the blend when vacuum-formed, for example, although there is some apparent improvment in physical properties of the blend as compared to the polystyrene phase alone.

The graded AB block copolymers are prepared generally by mixing the A and B monomers in a hexane or cyclohexane solution, adding an initiator such as sec-butyl lithium and heating at 30° to 50°C. as is well known in the art. The lithium atoms can be removed, for example, by a protonating agent. The preparation of a suitable graded AB block copolymer is described in Example I below.

It should be noted that processing conditions have a great effect on molecular weight of all components and on particle size of the discontinuous phase. High shear mixing tends to reduce the particle size of the discontinuous phase. For the purposes of this invention particle size of the dispersed phase, once reduced below the stated minimums, cannot be corrected. The particle sizes of greatest importance apply to the dispersed particles in the final blended product. Particle size was determined optically or by electron microscopy.

While there is no complete theory as to why the subject polymer blends produce the properties they do, rheology of the polymer blends indicates that the block polymer significantly improves the flow characteristics of a polymer blend over a similar blend without the block polymers.

The polymer blends of this invention contain styrene-type and diene-type polymers as described above in a weight ratio of at least about 4:1 and contain at least about 3 weight percent of the diene-type polymers. There is preferably about 7 to 15 weight percent diene-type polymers in these blends. The block copolymer can be employed in these blends in an amount of from about 6 to 50 weight percent of the total blend, but there is preferably only about 9.5 or 10 to 36 weight percent and as a practical matter no more than about 20 weight percent. The weight ratio of block polymer to diene-type polymer must be at least 0.5 and is preferably in the range of about 0.8 to about 1.2. In the butadiene-polystyrene blend employing graded AB block copolymer it has been found that the total vinyl aromatic, e.g. styrene, content, both as homopolymer and copolymer, should be in the range of 75 to 90 weight percent of the total blend, preferably from about 80 to about 85 weight percent, in order to achieve optimum impact, flexural and heat distortion characteristics.

Of particular interest are the blends in which the monomers employed in all the components are limited to styrene and butadiene. Such blends can be prepared by properly melt mixing under shear stress without a significant decrease in physical properties over similar blends prepared in solution systems.

The blends of this invention can be prepared by any of the methods well known in the art as exemplified by the patent references cited above. Melt mixing under shear stress as in Banbury blenders, mills and/or continuous mixers has proved to be successful for the blends of this invention.

The following examples are illustrative of the best methods and alternative methods of preparing the compositions of this invention and are not intended to limit this invention which is properly delineated in the claims. Unless otherwise stated, quantitative measurements are by weight.

EXAMPLE I

Block copolymers V, W and X in this example were graded styrene-butadiene AB block copolymers in which each A represents essentially polymerized styrene and each B represents essentially polymerized butadiene, the weight ratios of styrene to butadiene in A and B being 60/40, 50/50 and 40/60 respectively. Each block copolymer was prepared in an agitated benzene solution, there being sufficient benzene present at all times to give a solution containing no more than 10 weight percent solids. Styrene monomer was dissolved in benzene at room temperature. Sec-butyl lithium was added slowly until the first hint of light yellow color indicated that all impurities had reacted and would not interfere with the subsequent polymerization. Then sufficient butadiene was added to give the desired styrene/butadiene weight ratio. Again sec-butyl lithium was added, this time in an amount calculated to react with any additional impurities without generating polymerization. A catalytic amount of sec-butyl lithium catalyst was then added, and each mixture was heated at 50°C. to produce the desired copolymer having a number average molecular weight in the range of 200,000 to 300,000 and comprising one terminal portion rich in polybutadiene and the other terminal portion rich in polystyrene. Each living copolymer was deactivated or killed by the addition of isopropanol until the solution became colorless. An antioxidant (2,5-di-t-butyl-paracresol) was added as an isopropanol solution of 0.01 gram of the antioxidant per milliliter of isopropanol such that there was about 1 weight percent antioxidant based on the initial weight of the butadiene.

It is now preferable to prepare each of the subject graded block copolymers by the following steps:
1. dissolving styrene monomer and butadiene monomer in hexane in amounts to give the desired styrene/butadiene weight ratio and to give a solution containing about 15 weight percent solids,
2. heating the solution to 150°F.,
3. slowly adding a one percent solution of n-butyl lithium in n-hexane at 150°F. until there is a slight exotherm indicating that all impurities had reacted, and then
4. adding the catalytic amount of sec-butyl lithium and heating at 150°F. for about 4 hours to obtain the desired copolymer which is deactivated as described above, and an antioxidant is added.

The graded AB block copolymer solution can be used for solution blending or the solvents can be steam-stripped off leaving the graded AB block copolymer as a fine crumb for milling, blending or other solid state mixing procedure.

Each of block copolymers V, W and X in benzene solution at 30°C. was solution blended with a commercial polystyrene having a number average molecular weight of 120,000 and a commercial polybutadiene having a Mooney viscosity ML-4 of 56 equivalent to a number average molecular weight in the range of 200,000 in amounts to give a blend having a total styrene content in the polyblend of 80 weight percent. In each case the block copolymer and polybutadiene were present in the form of particles at least 70 weight percent of which had diameters between 0.2 and 5 microns. The polymer blend is best isolated by adding the benzene solution to agitated isopropanol. Precipitation of the polymer blend takes place. The resulting white polymer blend is then dried in a vacuum oven at 50°C. to a constant weight.

Test specimens of each of the polymer blends were prepared by placing the polymer blend between two plates coated with polytetra-fluoroethylene and heating to 370°F. for 1 minute to change the polymer blend into a fused disc which was cut into strips and compression molded at 370°F. for 10 minutes at 20,000 psi into test bars 2.5 × 6 × 0.125 inches and 1.125 × 6 × 0.125 inches. Test specimens were cut from the test bars and were used in a number of tests including determination of flexural modulus by ASTM physical test method 2418, determination of notched Izod impact strength, and determination of heat distortion temperature (°C.) when test specimens had deflected 10 mils and 60 mils at an applied load of 264 psi.

TABLE

| Blend | I-A | I-B | I-C |
|---|---|---|---|
| Block Copolymer | V | W | X |
| Weight Percent of | | | |
| Polystyrene | 72.5 | 73.75 | 75 |
| Polybutadiene | 15 | 13.75 | 12.5 |
| Block Copolymer | 12.5 | 12.5 | 12.5 |
| Flexural Modulus (psi) | 261,000 | 263,000 | 256,000 |
| Notched Izod Impact (ft.-lbs./inch notch) | 6.9 | 9.1 | 9.3 |
| Heat Distortion Temp. (°C.) | | | |
| 10 mil | 85 | 86 | 86 |
| 60 mil | 95 | 95 | 98 |

By comparison, similarly prepared test specimens of a commercial "high impact" polystyrene and a commercial "high flexural modulus" polystyrene showed flexural moduli of 227,000 and 382,000 psi respectively, notched Izod impact strengths of 1.60 and 1.15 ft.-lbs./inch notch respectively, 10 mil deflections at 79°C. and 75°C. respectively and 60 mil deflections at 88°C. and 84°C. respectively.

EXAMPLE II

When polymer blends like Blends I-A, I-B and I-C from Example I are prepared by mill mixing the components for 10 minutes at 325°F. in the absence of solvent, test specimens of these polymer blends prepared and tested according to the methods described in Example I show similar excellent physical properties and balance of physical properties.

Compounds of this invention are of particular interest because of their excellent properties at low temperatures as well as at room temperatures. For example, polymer blends of this invention have excellent balance of physical properties including having excellent notched Izod impact strengths at 0°F. and −40°F. In fact, the notched Izod impact strengths of the polymer blends of this invention at −40°F. are as good as or better than the room temperature impact strengths of commercially available high impact polystyrene. Generally, it has been found that for the preferred polymer blends of this invention the impact strengths at 0°F. and −40°F. are about one-half and about one-third respectively of the impact strengths at room temperature.

Miscellaneous additives such as pigments can be included in the blends of this invention.

The compositions of this invention like previously known high impact polystrenes are of particular use for toys and refrigerator linings.

For the purposes of this invention, the discontinuous phase is dispersed in the continuous phase or matrix as particles at least 70 weight percent of which have particle diameters in the range of 0.2 to 5 microns as measured by the "Zeiss Particle Size Analyzer." This analyzer and its use is described in "New Techniques of Particle Analysis" by D. W. Montgomery in *Rubber Age*, February 1964.

I claim:

1. A blend characterized by exhibiting excellent properties such as impact strength at low temperatures as well as room temperatures, said blend consisting essentially of
   A. a matrix of polymers prepared from at least 90 weight percent monovinyl aryl monomers including at least 35 weight percent styrene, any other monomers being other ethylenically unsaturated monomers, said polymers having a number average molecular weight of from about 50,000 to 500,000;
   B. non-crosslinked polymers prepared from at least 60 weight percent 1,3-butadiene, 0 to 40 weight percent styrene or alpha-methylstyrene and 0 to 10 weight percent of other ethylenically unsaturated monomers, the number average molecular weight of said polymers being at least 100,000; and
   C. graded block copolymers of the type AB in which A represents essentially polymerized styrene, the balance of said segment being polymerized butadiene, and B represents essentially polymerized butadiene, the balance of said segment being polymerized styrene, the weight ratio of total styrene to total butadiene in A and B ranging from 35:65 to 60:40, the number average molecular weight of said block copolymers being from 150,000 to 500,000, said graded block copolymers having a principal glass transition temperature of about −90°C. ± 5°C.;

components (B) and (C) being in said component (A) as a discontinuous phase of particles of which at least 70 weight percent have diameters in the range of 0.2 to 5 microns, components (A) and (B) being present in a weight ratio of at least about 4:1 and being sufficiently incompatible that the ultimate blend without (C) distinctly shows the glass transition temperature of (B), component (B) being present in the blend in an amount of at least about 3 weight percent, component (C) being present in the blend in an amount of from about 6 to 50 weight percent of the total blend, the weight ratio of component (C) to component (B) being at least 0.5 and the total monovinyl monocyclic aryl units in components (A), (B) and (C) being from 75 to 90 weight percent of the total units in said components.

2. A blend in accordance with claim 1 wherein the polymers in component (A) comprise at least 90 weight percent polymerized styrene and the polymers in component (B) comprise at least 90 weight percent polymerized conjugated dienes.

3. A blend in accordance with claim 2 wherein the polymers in component (A) have a number average molecular weight of 100,000 to 300,000, the polymers in component (B) have a number average molecular weight of 250,000 to 500,000, the copolymers in component (C) have a number average molecular weight of 200,000 to 300,000.

4. A blend in accordance with claim 3 wherein the polymers in component (A) are polymerized monovinyl-substituted monocyclic aryl compounds and the polymers in component (B) are polymerized conjugated dienes of four to five carbon atoms.

5. A blend in accordance with claim 4 wherein component (A) consists essentially of polystyrene and component (B) consists essentially of polybutadiene.

6. A blend in accordance with claim 5 wherein component (C) is present in an amount equal to from 9.5 to 36 weight percent of the total blend, the weight ratio of component (C) to component (B) is in the range of 0.8 to 1.2 and components (A) and (B) are present in such proportion that the total polymerized styrene content is from 80 to 85 weight percent of the total blend.

7. a method of making resins having excellent impact strengths, flexural moduli and heat distortion characteristics, particularly at low temperatures, comprising blending a mixture consisting essentially of
   A. a matrix of polymers prepared from at least 90 weight percent vinyl aryl monomers including at least 35 weight percent styrene, any other monomers being other ethylenically unsaturated monomers, said polymers having a number average molecular weight of from about 50,000 to 500,000;
   B. non-crosslinked polymers prepared from at least 60 weight percent 1,3-butadiene, 0 to 40 weight percent styrene or alpha-methylstyrene and 0 to 10 weight percent of other ethylenically unsaturated monomers, the number average molecular weight of said polymers being at least 100,000; and
   C. graded block copolymers of the type AB in which A represents essentially polymerized styrene, the balance of said segment being polymerized butadiene, and B represents essentially polymerized butadiene, the balance of said segment being polymerized styrene, the weight ratio of total styrene to total butadiene in A and B ranging from 35:65 to 60:40, the number average molecular weight of said block copolymers being from 150,000 to 500,000, said graded block copolymers having a principal glass transition temperature of about −90°C. ± 5°C.;

components (B) and (C) being in said component (A) as a discontinuous phase of particles of which at least 70 weight percent have diameters in the range of 0.2 to 5 microns, components (A) and (B) being present in a weight ratio of at least about 4:1 and being sufficiently incompatible that the ultimate blend without (C) distinctly shows the glass transition temperature of (B), component (B) being present in the blend in an amount of at least about 3 weight percent, component (C) being present in the blend in an amount of from about 6 to 50 weight percent of the total blend, the weight ratio of component (C) to component (B) being at least 0.5 and the total monovinyl monocyclic aryl units in components (A), (B) and (C) being from 75 to 90 weight percent of the total units in said components.

8. A method in accordance with claim 7 wherein the mixture is blended in a mutual solvent and precipitated from said solvent.

9. A method in accordance with claim 7 wherein the mixture is blended by heating at a temperature of at least 310°F.

10. A method in accordance with claim 7 wherein the polymers in component (A) comprise at least 90 weight percent polymerized styrene and the polymers in component (B) comprise at least 90 weight percent polymerized conjugated dienes.

11. A method in accordance with claim 10 wherein the polymers in component (A) have a number average molecular weight of 100,000 to 300,000 the polymers in component (B) have a number average molecular weight of 250,000 to 500,000 and the copolymers in component (C) have a number average molecular weight of 200,000 to 300,000.

12. A method in accordance with claim 11 wherein the polymers in component (A) are polymerized monovinyl-substituted monocyclic aryl compounds and the polymers in component (B) are polymerized conjugated dienes of four to five carbon atoms.

13. A method in accordance with claim 12 wherein component (A) consists essentially of polystyrene and component (B) consists essentially of polybutadiene.

14. A method in accordance with claim 13 wherein component (C) is present in an amount equal to from 9.5 to 36 weight percent of the total blend, the weight ratio of component (C) to component (B) is in the range of 0.8 to 1.2 and components (A) and (B) are present in such proportion that the total polymerized styrene content is from 80 to 85 weight percent of the total blend.

15. A method in accordance with claim 13 wherein components (B) and (C) are in said component (A) as a discontinuous phase of particles of which at least 85 weight percent have diameters in the range of 0.2 to 5 microns.

16. A blend in accordance with claim 5 wherein components (B) and (C) are in said component (A) as a discontinuous phase of particles of which at least 85 weight percent have diameters in the range of 0.2 to 5 microns.

* * * * *